USO07025267B2

United States Patent
Benedetti (10) Patent No.: US 7,025,267 B2
(45) Date of Patent: Apr. 11, 2006

(54) METHOD FOR READING A GRAPHIC PATTERN AND ACQUIRING ITS IMAGE

(75) Inventor: Michele Benedetti, Bologna (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 10/747,873

(22) Filed: Dec. 29, 2003

(65) Prior Publication Data

US 2005/0082369 A1 Apr. 21, 2005

(30) Foreign Application Priority Data

Dec. 31, 2002 (EP) ................................ 02425813

(51) Int. Cl.
G06K 7/10 (2006.01)
G06K 7/14 (2006.01)

(52) U.S. Cl. .................. 235/454; 235/455; 235/462.06

(58) Field of Classification Search ........... 235/462.06, 235/462.12, 462.25, 462.26, 462.42, 455, 235/454, 472.01; 205/205, 200, 566, 208; 382/181–183
See application file for complete search history.

(56) References Cited

U.S. PATENT DOCUMENTS

| | | | | |
|---|---|---|---|---|
| 4,319,137 A * | 3/1982 | Nakamura et al. .......... 250/556 |
| 4,516,017 A * | 5/1985 | Hara et al. ............. 235/462.28 |
| 4,818,847 A | 4/1989 | Hara et al. ................ 235/455 |
| 5,144,117 A * | 9/1992 | Hasegawa et al. .......... 235/455 |
| 5,196,684 A * | 3/1993 | Lum et al. ............. 235/462.42 |
| 5,258,605 A * | 11/1993 | Metlitsky et al. ....... 235/462.32 |
| 5,354,977 A | 10/1994 | Roustaei ..................... 235/472 |
| 5,528,022 A * | 6/1996 | Nakazawa .................. 235/436 |
| 5,532,467 A * | 7/1996 | Roustaei ................ 235/462.42 |
| 5,545,886 A * | 8/1996 | Metlitsky et al. ....... 235/462.42 |
| 5,648,650 A * | 7/1997 | Sugifune et al. ........ 235/462.25 |
| 5,701,001 A * | 12/1997 | Sugifune et al. ....... 235/462.42 |
| 5,777,314 A * | 7/1998 | Roustaei ................ 235/462.42 |
| 6,050,387 A * | 4/2000 | Iwaki ......................... 194/207 |
| 6,133,580 A * | 10/2000 | Sun ............................ 250/566 |
| 6,501,087 B1* | 12/2002 | Koretsune et al. .......... 250/566 |
| 6,634,553 B1* | 10/2003 | Reasoner et al. ...... 235/462.22 |
| 6,817,525 B1* | 11/2004 | Piva et al. .................. 235/454 |
| 6,824,060 B1* | 11/2004 | Barkan .................. 235/462.25 |
| 2002/0001033 A1* | 1/2002 | Ohzu et al. ................. 348/207 |

(Continued)

FOREIGN PATENT DOCUMENTS

IT EP 1 205 871 5/2002
IT EP 1437676 A1 * 7/2004

*Primary Examiner*—Karl D. Frech
*Assistant Examiner*—Daniel Walsh
(74) *Attorney, Agent, or Firm*—IPLM Group, P.A.

(57) ABSTRACT

A method for reading a graphic pattern by illuminating the graphic pattern with at least two groups of light sources, each of the at least two groups of light sources having at least one light source operating according to an illumination cycle that comprises an illumination cycle-portion and a non-illumination cycle-portion. The light sources of one of the at least two groups of light sources are activated according to equal illumination cycles. The illumination cycles of the light sources belong to different ones of the at least two groups of light sources having a reciprocally different timing. Light is gathered from the light sources having been diffused by the graphic pattern on a sensor having a plurality of sensitive points. Light impinging on the plurality of sensitive points is converted, through a conversion cycle of the sensor, point by point into electric signals representative of single points of the graphic pattern, at a same time for all of the plurality of sensitive points.

24 Claims, 5 Drawing Sheets

U.S. PATENT DOCUMENTS

2002/0056754 A1* 5/2002 Bianchi .................. 235/462.26
2003/0080187 A1* 5/2003 Piva et al. .................. 235/454
2004/0074969 A1* 4/2004 Knowles et al. ........ 235/462.31
2005/0023352 A1* 2/2005 Patel et al. .................. 235/454

* cited by examiner

METHOD FOR READING A GRAPHIC PATTERN AND ACQUIRING ITS IMAGE

TECHNICAL FIELD

The present invention relates to the reading of a graphic pattern, this term indicating a one- or two-dimensional graphic representation, such as, for example, typically an optical code (barcode, two-dimensional code, colour code, etc.), or also any image that must be acquired.

BACKGROUND

The image acquisition of a graphic pattern is typically performed according to two main techniques: the laser scanning technique, wherein the graphic pattern is scanned by a laser beam and the light diffused point by point by the illuminated graphic pattern is gathered on a substantially punctiform sensor and converted into electric signal, and the CCD or CMOS techniques, wherein more points of the graphic pattern are illuminated at the same time (on a total or partial area of the graphic pattern, or on a line) and the light diffused by all the illuminated points is gathered on a one- or two-dimensional optical sensor (of the CCD or CMOS type), capable of converting the light impinging it point by point into electric signals representing the single points of the graphic pattern, simultaneously for all sensitive points. The invention refers to the latter of the two techniques.

Theoretically, the graphic pattern can be illuminated just by the ambient light, but specific illumination means are normally used, typically sets of approximately punctiform illuminating elements (such as light diodes or LED), arranged in a one-dimensional array or in a two-dimensional matrix, according to whether the reading is made by lines or by areas.

The light diffused by the illuminated portion of graphic pattern is gathered by an optical reception system (comprising lenses, diaphragms, mirrors and the like) and focused on the optical sensor. Finally, the optical sensor comprises an array or an ordered matrix of single punctiform sensor elements, each gathering—at the same time as the others—the light coming from the graphic pattern and converting it, always at the same time as the other punctiform elements, into a set of electric signals representing the optical characteristics of the single points of the graphic pattern, thereby electrically reconstructing its image.

The problem of the unevenness of illumination on the area or line to be read is well known in the art. In fact, the central portion of the area or of the line to be read is illuminated more intensely than the peripheral zones. This phenomenon, graphically shown in FIG. 2 in the case of an array of four LEDs, is unavoidably associated to the geometrical arrangement of the single illuminating elements and to the fact that each of them has an emission cone of a certain width. As it can be easily seen in FIG. 2, the central zone receives illuminating power (light energy per area unit) from each of the various LEDs, whereas each of the two rightmost and leftmost zones only receives illuminating power from the closest LED. The resulting distribution curve of the illuminating power has a peak at about the centre and decreases towards the ends. The same thing of course applies in case of two-dimensional illumination.

The result is that the peripheral zones of the graphic pattern are less illuminated than the central zone, and so they diffuse less light, thereby producing an image of the graphic pattern that is distorted from the luminous intensity point of view.

Figure 3:
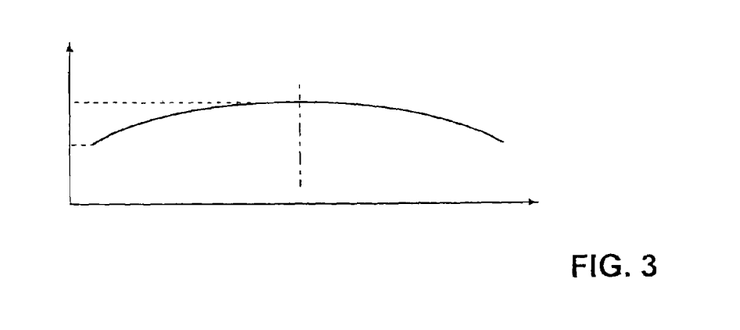
FIG. 3 is a diagram showing the uneven transmission of the diffused light gathered by a typical optical reception system.

Moreover, the problem of the illumination unevenness is made worse by the uneven transmission of the optical reception system, which normally tends to transmit the illuminating power better in its central zone (close to the optical system axis) than in the peripheral zones. A typical pattern of this phenomenon is shown in FIG. 3, which shows how the power of the light composing the image decreases from the centre towards the edges.

The main effect of the phenomenon described is that the electric signal generated by the optical sensor will depend on the amount of light received, and therefore it will have a variable amplitude pattern in the field of view, according to the distance from the axis of the optical reception system.

The overlapping of this unevenness can create serious problems for the proper acquisition of the image; for example, without corrective measures it may even occur that the noise gathered in the central zone has the amplitude comparable to the signal collected in a peripheral zone. This amplitude unevenness can negatively affect the performance of the equipment for acquiring or reading the graphic pattern, in terms of reduction of the aperture or of the depth of the reading field.

Such effects are further made worse as the reading or acquisition distance increases, since the electric signal becomes weaker.

Several approaches are known in the art to correct this situation.

According to a first approach, the problem is dealt with at the origin, by providing for the central LED to be piloted so as to produce a less intense illumination compared to the peripheral ones. Examples of this approach can be found, for example, in U.S. Pat. Nos. 4,818,847 and 5,144,117.

According to another approach that deals with the problem at the origin as well, the spatial distribution of the LEDs and/or the orientation of their axes are not even; more precisely, the central LEDs are made to be more spaced from one another or their axes are made to diverge towards the peripheral zones. An example of this approach is provided in U.S. Pat. No. 5,354,977.

Another known approach (EP-A-1205871), on the other hand, provides for an intervention during the signal electronic processing; that is, it is accepted that the generated signal is affected by the above unevenness to intervene downstream by a gain system which is variable from zone to zone of the image.

SUMMARY OF THE INVENTION

The present invention aims at providing a different approach.

Accordingly, the invention relates to a method for reading a graphic pattern. The graphic pattern is illuminated with at least two groups of light sources, each of the at least two groups of light sources having at least one light source operating according to an illumination cycle that comprises an illumination cycle-portion and a non-illumination cycle-portion. The light sources of one of the at least two groups of light sources are activated according to equal illumination cycles. The illumination cycles of the light sources belong to different ones of the at least two groups of light sources having a reciprocally different timing. Light is gathered from the light sources having been diffused by the graphic pattern on a sensor having a plurality of sensitive points. Light impinging on the plurality of sensitive points is converted, through a conversion cycle of the sensor, point by point into electric signals representative of single points of the graphic pattern, at a same time for all of the plurality of sensitive points.

Differentiated timing means that there are time instants in which the light sources in a group are activated while the light sources in another group are not activated.

Since the method of the invention provides for the non-concurrent activation of the light sources belonging to different groups, it allows selectively illuminating the graphic pattern and therefore accounting for both illumination and transmission unevenness of the system as a whole.

Preferred solutions of the invention are indicated in the dependent claims.

BRIEF DESCRIPTION OF THE DRAWING

Features and advantages of the present invention will appear more clearly from the following detailed description of some of its preferred embodiments, made with reference to the attached drawings. In such drawings.

DETAILED DESCRIPTION

Figure 1:
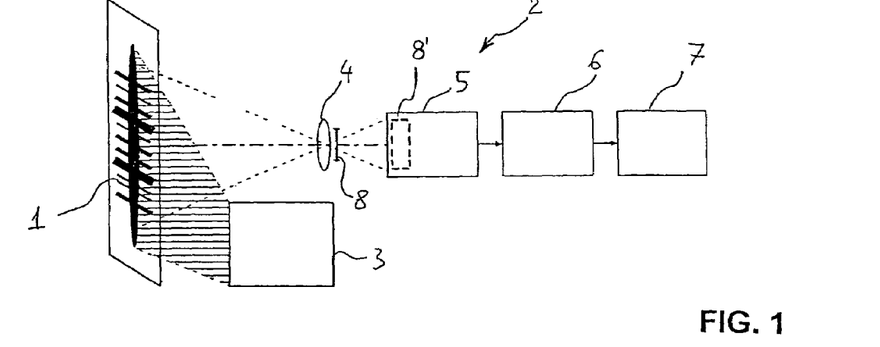
FIG. 1 is a diagram of an equipment for reading a graphic pattern.

FIG. 1 shows a graphic pattern 1, for example a barcode, whose reading is performed by a reading equipment, only schematically shown and globally indicated with reference numeral 2, which comprises an illuminating system 3, an optical reception system 4, a sensor 5, a signal processing unit 6, and a decoding unit 7. In the operation, the single points of the graphic pattern 1 illuminated by the illuminating system 3 emit diffused light that is gathered by the optical system 4 and carried onto sensor 5, where it is converted into electric signals that are first processed in the processing unit 6, and then decoded in the decoding unit 7.

Sensor 5 consists of a plurality of flanked sensitive points, each of which generates—at the same time as the other sensitive points—an electric signal correlated to the characteristics of the light that impinges on it, and thereby to the characteristics of a corresponding point of the graphic pattern 1; the sensitive points can be arranged along a line (one-dimensional sensor), or in an area (two-dimensional sensor). Typically, said sensor 5 will be of the CCD or CMOS type.

The optical system 4 can optionally be provided with a shutter 8, for example of the mechanical type. According to an alternative preferred solution, an electronic shutter 8' can be directly associated to sensor 5. The electronic shutter 8' operates on the converted signal removing (resetting) the portion of signal converted starting from an initial instant to a subsequent predetermined instant. The action of shutter 8 or 8' can be controlled by signals generated by a control unit integrated in the same sensor, or separate from the sensor and contained in a suitable microcontroller (not shown).

Figure 10:
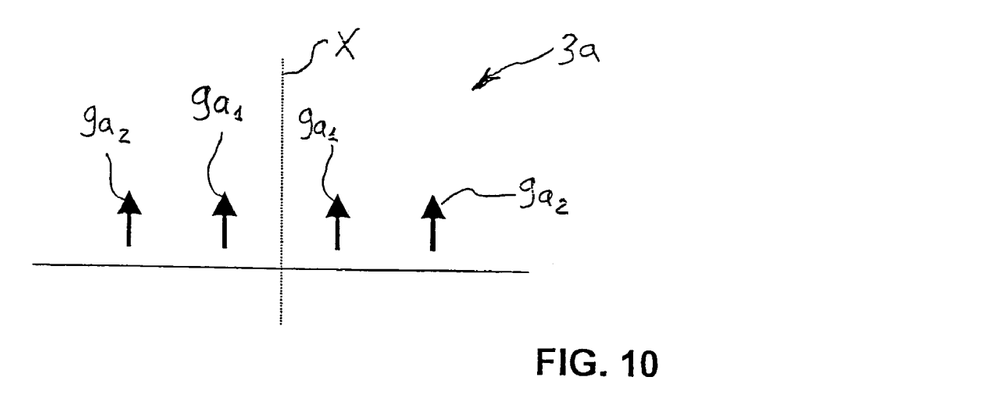
FIGS. 10 and 11 schematically show two illuminating systems to which it is possible to apply the embodiments of the invention of FIG. 4, FIG. 5, FIG. 8 and FIG. 9.
Figure 11:
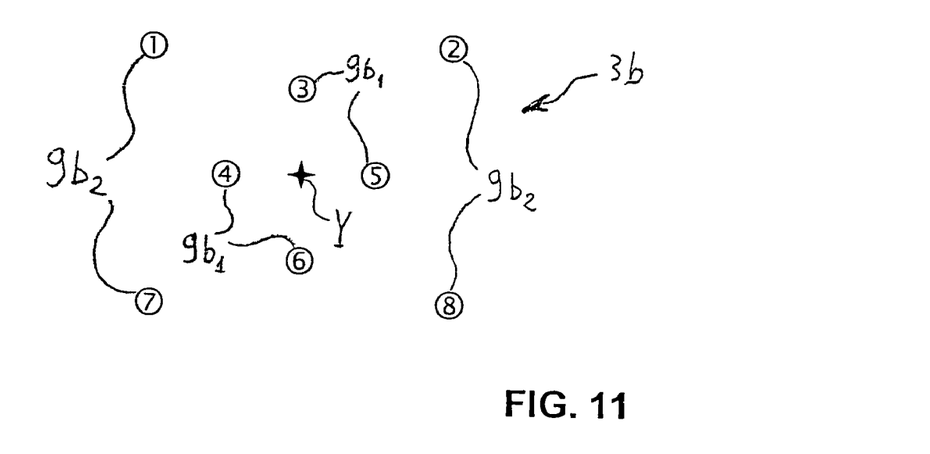
Figure 12:
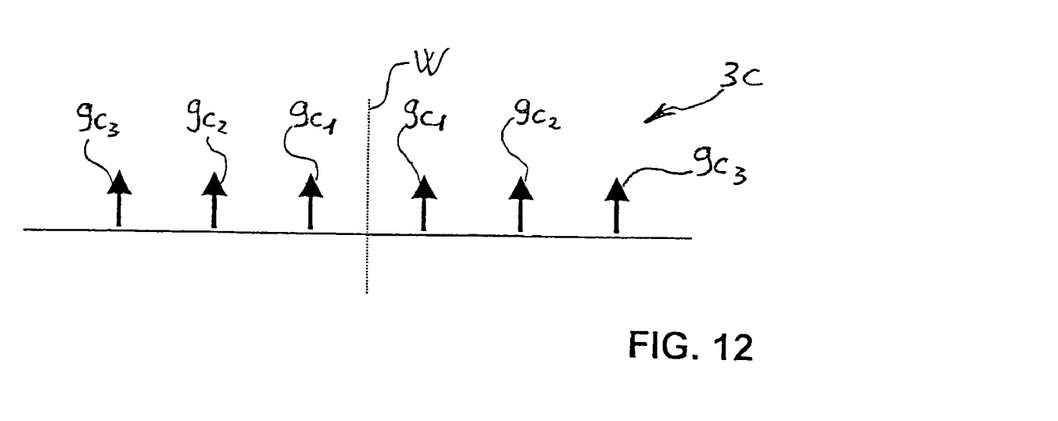
FIG. 12 schematically shows an illuminating system to which it is possible to apply the embodiment of the invention of FIG. 7.

The illuminating system 3 comprises a plurality of light sources 9 divided into groups. More precisely, in the FIGS. from 10 to 12 the illuminating system and the light sources are indicated, besides reference numerals 3 and 9, by a letter, according to the variant of the invention considered; moreover, the light sources 9 are marked by a further number to indicate the group they belong to.

So, FIG. 10 illustrates a one-dimensional illuminating system 3a, comprising four light sources 9a, divided into two groups according to their distance from the optical axis X of the illuminating system 3a itself; the two light sources $9a_1$ closer to the optical axis X belong to the first group, while the two light sources $9a_2$ farther from the optical axis X belong to the second group.

Similarly, FIG. 11 illustrates a two-dimensional illuminating system 3b, comprising eight light sources 9b, divided into two groups according to their distance from the optical axis Y of the illuminating system 3b itself; the four light sources $9b_1$ closer to the optical axis Y belong to the first group, while the four light sources $9b_2$, farther from the optical axis Y, belong to the second group.

Finally, FIG. 12 illustrates a one-dimensional illuminating system 3c, comprising six light sources 9c, divided into three groups according to their distance from the optical axis W of the illuminating system 3c itself; the two light sources $9c_1$ closer to the optical axis W belong to the first group, the two light sources $9c_2$ at an intermediate distance from the optical axis W belong to the second group, while the two sources $9c_3$, farther from the optical axis W, belong to the third group.

The illuminating system may also comprise an optical emission system (not shown) containing one or more lenses and possibly diaphragms, for focusing the light emitted by the light sources 9.

Figure 4:
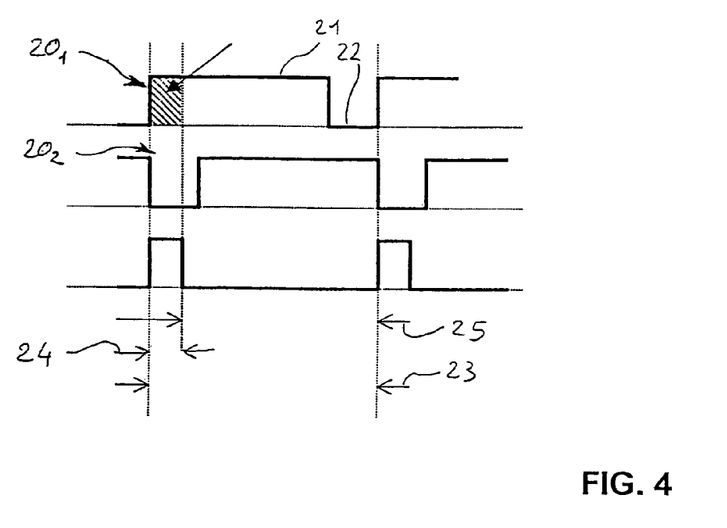
FIG. 4 is a diagram illustrating an embodiment of the invention, with illuminating system having two groups of light sources and optical reception system provided with shutter.

The embodiment of the invention shown in FIG. 4 provides for the presence of shutter 8 and for the light sources 9 to be divided into two groups. With reference to said embodiment, each light source 9a and 9b is fed according to an illumination cycle 20, which comprises an illumination cycle-portion 21 and a non-illumination cycle-portion 22 following one another over time; the action of shutter 8 makes the conversion on sensor 5 occur according to a conversion cycle 23 (or scanning period), comprising a non-acquisition step 24 and an acquisition step 25 (or exposure time) following one another over time.

As shown in FIG. 4, the illumination cycle of the light sources $9a_1$, $9b_1$, indicated with reference numeral $20_1$, is equal to the illumination cycle of the light sources $9a_2$, $9b_2$, indicated with reference numeral $20_2$, but the two cycles are not timed. This time difference causes the light emitted by the light sources $9a_1$, $9b_1$ of the first group to be partly unused or rejected, since it corresponds with the non-acquisition step 24; on the other hand, the light emitted by the light sources $9a_2$, $9b_2$ of the second group is fully used. The non-use of part of the light emitted by the light sources $9a_1$, $9b_1$ of the first group therefore allows compensating both the illumination unevenness and the transmission unevenness.

The amount of unused light emitted by sources $9a_1$, $9b_1$ of the first group can be adjusted both by adjusting the time difference between the two illumination cycles $20_1$ and $20_2$, and adjusting the duration of the non-acquisition step 24, as well as adjusting the duration of the illumination cycle-portion 21.

Figure 5:
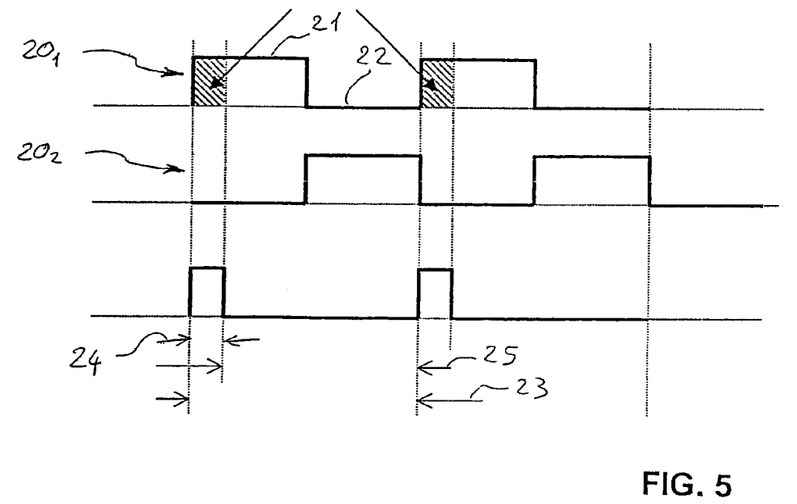
FIG. 5 shows a particular case of the embodiment shown in FIG. 4.
Figure 6:
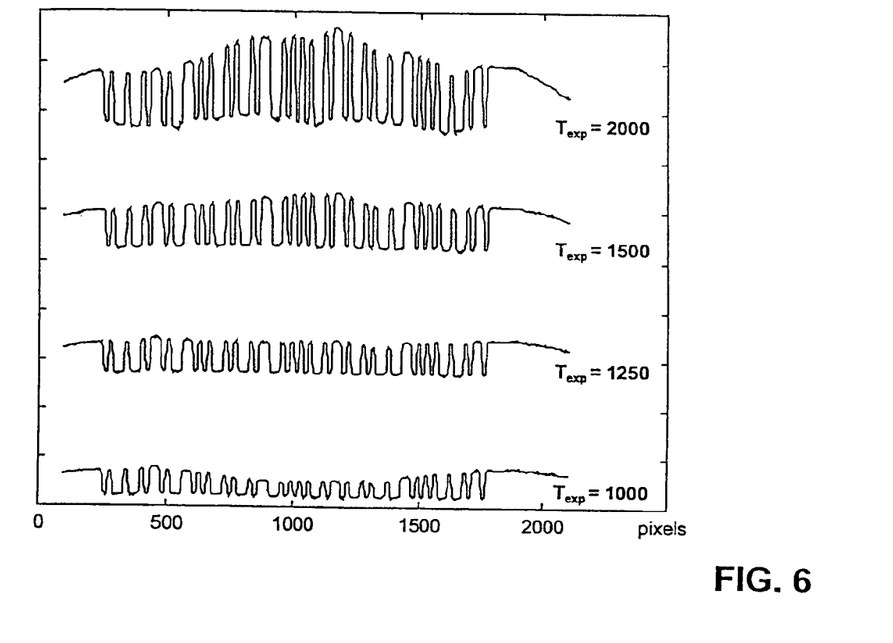
FIG. 6 shows four examples of readings made in different conditions, according to the embodiment shown in FIG. 5.

A particular and interesting case is that shown in FIG. 5, wherein the illumination cycle-portion 21 is equal to the non-illumination cycle-portion 22, and the two cycles $20_1$ and $20_2$ are in phase opposition. The phase opposition provides for a single group of light sources always on, thereby reducing the peak current absorbed by the illuminating system 3. FIG. 6 shows for this case the effect of the variation of the duration of the acquisition step 25 (or exposure time) on the signal produced by sensor 5; the four curves show how such duration can be advantageously adjusted to reduce, cancel or even reverse the effects of the illumination and transmission unevenness.

Figure 7:
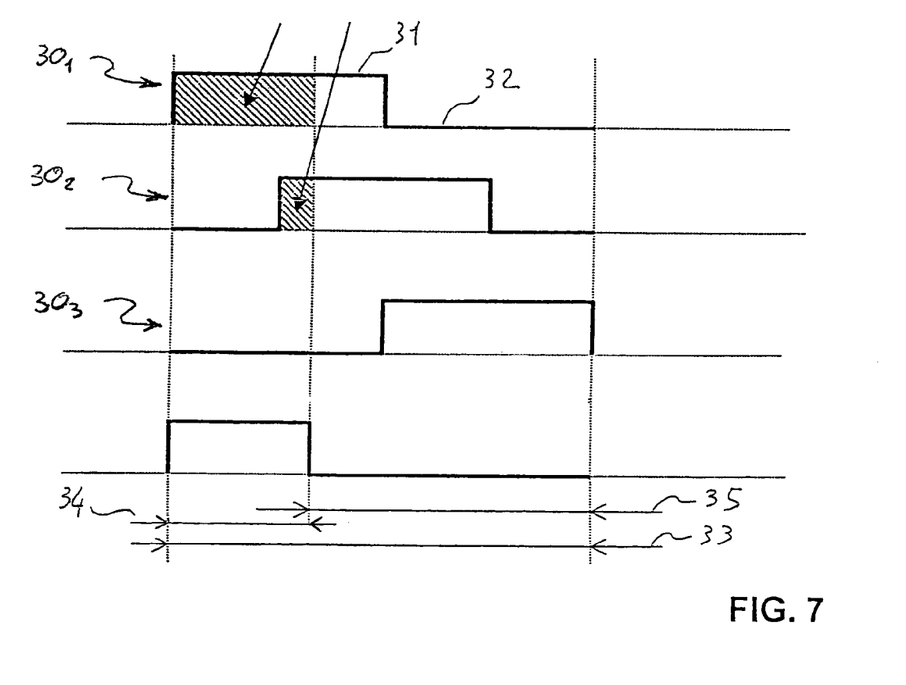
FIG. 7 is a diagram similar to that of FIG. 4, showing another embodiment of the invention, with illuminating system having three groups of light sources and optical reception system provided with shutter.

The embodiment of the invention shown in FIG. 7 provides for the presence of shutter 8 and for the light sources 9 to be divided into three groups. With reference to such embodiment, each light source $9c$ is fed according to an illumination cycle 30, which comprises an illumination cycle-portion 31 and a non-illumination cycle-portion 32 following one another over time; the action of shutter 8 makes the conversion on sensor 5 occur according to a conversion cycle 33, comprising a non-acquisition step 34 and an acquisition step 35 following one another over time.

As shown in FIG. 7, the illumination cycle of the light sources $9c_1$, indicated with reference numeral $30_1$, is equal to the illumination cycle of the light sources $9c_2$, indicated with reference numeral $30_2$, and to that of the light sources $9c_3$, indicated with reference numeral $30_3$, but the three cycles are not timed. This time difference causes the light emitted by the light sources $9c_1$ of the first group and $9c_2$ of the second group to be partly unused or rejected, since it corresponds with the non-acquisition step 34; on the other hand, the light emitted by the light sources $9c_3$ of the third group is fully used. The non-use of part of the light emitted by the light sources $9c_1$ and $9c_1$ of the first and of the second group therefore allows compensating both the illumination unevenness and the transmission unevenness.

As in the case of FIG. 4, also in this case the amount of unused light emitted by the sources $9c_1$ of the first group and $9c_2$ of the second group can be adjusted both by adjusting the time difference between the illumination cycles $30_1$, $30_2$ and $30_3$ and adjusting the duration of the non-acquisition step 34, as well as adjusting the duration of the illumination cycle-portion 31.

Figure 8:
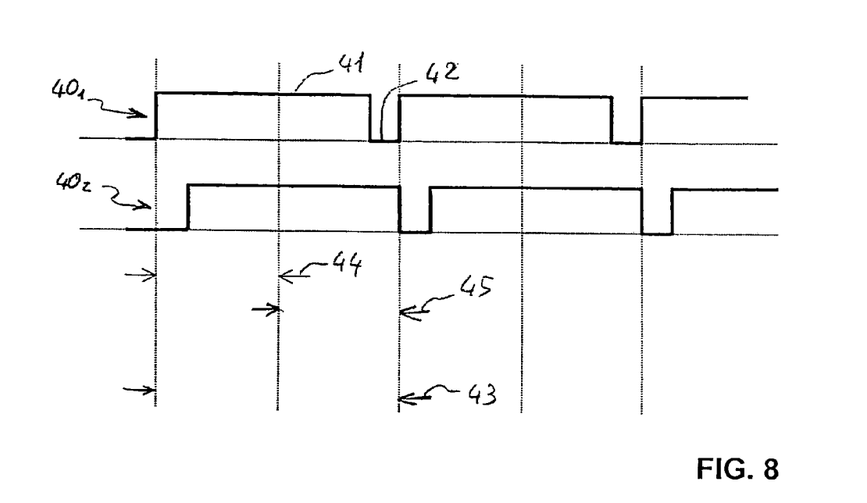
FIG. 8 is a diagram similar to that of FIG. 4, showing another embodiment of the invention, with illuminating system having two groups of light sources and optical reception system without shutter.

The embodiment of the invention shown in FIG. 8 provides for no shutter and for the light sources 9 to be divided into two groups. With reference to such embodiment, each light source $9a$ and $9b$ is fed according to an illumination cycle 40, which comprises an illumination cycle-position 41 and a non-illumination cycle-portion 42 following one another over time; without shutter, potential acquisition (or scanning) steps follow one another on sensor 5, which are alternately rejected and used, so as to have a conversion cycle 43, which comprises a non-acquisition step 44 and an acquisition step 45 having the same duration, that follow one another over time.

The situation is therefore similar to that discussed with reference to FIG. 4.

The embodiments illustrated in FIGS. 4–7 exhibit illumination cycles having the same period as the conversion cycle 23 (or 33) of the sensor. According to a variant, the conversion cycle 23 has a longer period than the illumination cycles. It is possible to select only a part of such cycle corresponding to the period of the illumination cycles, thereby determining the acquisition step 25 and the non-acquisition step 24. That is, in this case the method only works on the first illumination cycle and the converted signal in the remaining portion of cycle 23 is rejected.

Figure 9:
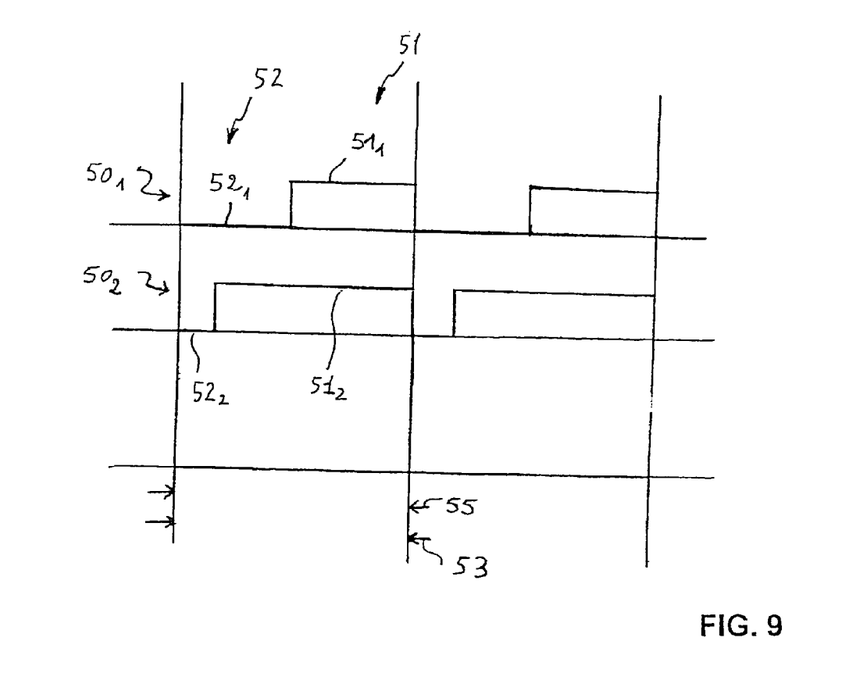
FIG. 9 is a diagram similar to that of FIG. 4, showing another embodiment of the invention, with illuminating system having two groups of light sources and optical reception system without shutter.

The embodiment of the invention shown in FIG. 9 provides for no shutter and for the light sources 9 to be divided into two groups. With reference to such embodiment, each light source $9a$ and $9b$ is fed according to an illumination cycle 50, which comprises an illumination cycle-portion 51 and a non-illumination cycle-portion 52 following one another over time. The illumination cycles 50 differ in the two groups of sources $9a$ and $9b$ and in particular, the duration of the illumination cycle-portion $51_2$ for sources $9a_2$ and $9b_2$ (cycle $50_2$) is longer than that $51_1$ for sources $9a_1$, $9b_1$ (cycle $50_1$). Conversion cycles 53 follow one another on sensor 5 with a period corresponding to that of the illumination cycles 50; the conversion cycles 53 only comprise an acquisition step 55 and no non-acquisition step. The effect of this solution is that the quantity of light emitted by the sources of the second group $9a_2$ and $9b_2$ (given by the integral of the respective waveform represented) is greater than that emitted by the first group, therefore compensating both the illumination unevenness and the transmission unevenness.

According to a variant, the conversion cycle 53 has a longer period than the illumination cycles $50_1$ and $50_2$. It is possible to select only a portion of such cycle corresponding to the period of the illumination cycles, thereby determining the acquisition step 55.

The embodiments shown in FIGS. 4–8 exhibit equal illumination cycles between the different groups of sources.

However, it is also possible to differentiate such cycles from one another, for example by increasing the duration of the illumination cycle-portion of a given group of sources with respect to another one, similarly to what described for the embodiment of FIG. 9. In this way it is possible to increase the correction effect already produced by the non-use of part of the light emitted by a predetermined group of sources.

Moreover, it is possible to increase the effect given by the methods illustrated above by also differentiating the intensity of the sources feeding current for the different groups of sources, for example suitably increasing it in cycles $20_2$ of FIGS. 4 and 5, $30_3$ of FIG. 7 and $40_2$ of FIG. 8.

Finally, in all of the above embodiments, it is possible to vary the intensity of the sources feeding current according to the distance of the graphic pattern.

Figure 2:
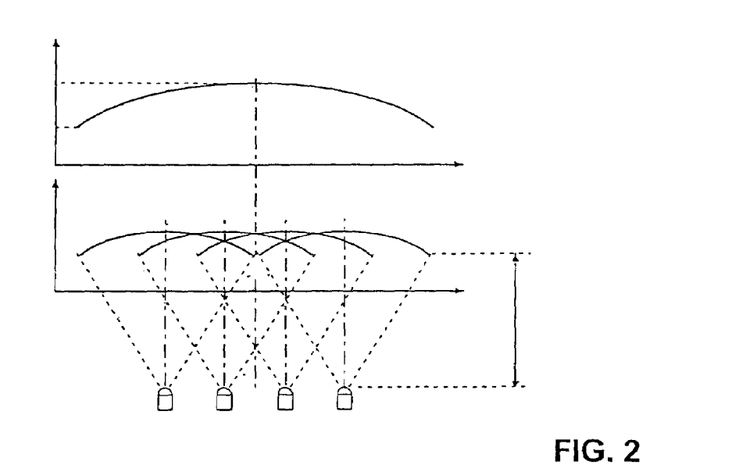
FIG. 2 is a diagram showing the uneven illumination if the illuminating system comprises an array of four LEDs.

The invention has been described in various embodiments with reference to the typical case in which the illumination and transmission unevenness occurs as shown in FIGS. 2 and 3, with peak (or privileged illumination zone) in the proximity of the optical axis, and minimum at the periphery.

However, it can be advantageously applied in all cases of unevenness occurring for any reason, wherever the privileged illumination zone; it will be sufficient to select the groups of light sources in the most appropriate manner according to the specific unevenness to compensate.

Various modifications and alterations of this invention will be apparent to those skilled in the art without departing from the scope and spirit of this invention. It should be understood that this invention is not limited to the illustrative embodiments set forth above.

What is claimed is:

1. Method for reading a graphic pattern, comprising the steps of:
    illuminating said graphic pattern with at least two groups of light sources, each of said at least two groups of light sources having at least one light source operating according to an illumination cycle that comprises an illumination cycle-portion and a non-illumination cycle-portion;
    wherein said light sources of one of said at least two groups of light sources are activated according to equal illumination cycles,
    wherein said illumination cycles of said light sources belonging to different ones of said at least two groups of light sources have a reciprocally different timing;
    gathering light from said light sources having been diffused by said graphic pattern on a sensor having a plurality of sensitive points, and
    converting, through a conversion cycle of said sensor, said light impinging on said plurality of sensitive points, point by point, into electric signals representative of single points of said graphic pattern, at a same time for all of said plurality of sensitive points, said conversion cycle comprising an acquisition step and a non-acquisition step;
    wherein the acquisition step overlaps at least partially with said illumination cycle-portion of said light sources of each of said groups of light sources.

2. Method according to claim 1, wherein said illumination cycles of all of said light sources are equal to one another, and wherein said illumination cycles of said light sources of one of said at least two groups of light sources are not timed with respect to said illumination cycles of said light sources of a different one of said at least two groups of light sources.

3. Method for reading a graphic pattern, comprising the steps of:
    illuminating said graphic pattern with at least two groups of light sources, each of said at least two groups of light sources having at least one light source operating according to an illumination cycle that comprises an illumination cycle-portion and a non-illumination cycle-portion;
    wherein said light sources of one of said at least two groups of light sources are activated according to equal illumination cycles,
    wherein said illumination cycles of said light sources belonging to different ones of said at least two groups of light sources have a reciprocally different timing;
    gathering light from said light sources having been diffused by said graphic pattern on a sensor having a plurality of sensitive points, and
    converting, through a conversion cycle of said sensor, said light impinging on said plurality of sensitive points, point by point, into electric signals representative of single points of said graphic pattern, at a same time for all of said plurality of sensitive points,
    wherein said conversion cycle of said converting step comprises an acquisition step and a non-acquisition step.

4. Method according to claim 1, wherein said illumination cycle of each light source and said conversion cycle have a same period.

5. Method according to claim 4, wherein each of said light sources is located a distance from a privileged illumination zone, said method further comprising the step of dividing said light sources into one of said at least two groups of light sources according to said distance.

6. Method according to claim 5, wherein, for each of said light sources of one of said at least two groups of light sources, said illumination cycle-portion overlaps said gathering step wherein a greater distance of said light sources of said one of said at least two groups of light sources from said privileged illumination zone corresponds to a longer overlap.

7. Method according to claim 4, wherein in said conversion cycle said acquisition step and said non-acquisition step are regulated by a shutter, which, when activated, determines said non-acquisition step, and when not activated, determines said acquisition step.

8. Method according to claim 4, wherein said sensor operates according to a succession of scanning steps having said same period, such scanning steps being alternately used and not used, so that said scanning steps used determine said acquisition steps, whereas said scanning steps not used determine said non-acquisition steps.

9. Method according to claim 1, wherein said at least two groups of light sources comprises two groups.

10. Method according to claim 9, wherein said illumination cycle-portion of said illumination cycle of one of said two groups of light sources temporally corresponds to said non-illumination portion of the other one of said two groups of light sources.

11. Method according to claim 1, wherein said illumination cycle-portion of said illumination cycle of one of said at least two groups of light sources temporally corresponds to said non-illumination cycle-portion of another of said at least two groups of light sources.

12. Method according to claim 1, wherein said illumination cycle-portion of said illumination cycle of one of said at least two groups of light sources temporally corresponds to said non-illumination cycle-portion of all the other ones of said at least two groups of light sources.

13. Method according to claim 1, wherein said reciprocally different timing is variable.

14. Method according to claim 1, wherein the non-acquisition step overlaps at least partially with the illumination cycle-portion of the light sources of at least one of the groups of light sources.

15. Method for reading a graphic pattern, comprising the steps of:
    illuminating said graphic pattern with at least two groups of light sources, each of said at least two groups of light sources having at least one light source operating according to an illumination cycle that comprises an illumination cycle-portion and a non-illumination cycle-portion;
    wherein said light sources of one of said at least two groups of light sources are activated according to equal illumination cycles,
    wherein said illumination cycles of said light sources belonging to different ones of said at least two groups of light sources have a reciprocally different timing;

gathering light from said light sources having been diffused by said graphic pattern on a sensor having a plurality of sensitive points, and converting, through a conversion cycle of said sensor, said light impinging on said plurality of sensitive points, point by point, into electric signals representative of single points of said graphic pattern, at a same time for all of said plurality of sensitive points, said conversion cycle comprising an acquisition step and a non-acquisition step, wherein the non-acquisition step overlaps at least partially with the illumination cycle-portion of the light sources of at least one of the groups of light sources.

16. Method according to claim 15, wherein said illumination cycles of all of said light sources are equal to one another, and wherein said illumination cycles of said light sources of one of said at least two groups of light sources are not timed with respect to said illumination cycles of said light sources of a different one of said at least two groups of light sources.

17. Method according to claim 16, wherein said illumination cycle of each light source and said conversion cycle have a same period.

18. Method according to claim 17, wherein each of said light sources is located a distance from a privileged illumination zone, said method further comprising the step of dividing said light sources into one of said at least two groups of light sources according to said distance.

19. Method according to claim 18, wherein, for each of said light sources of one of said at least two groups of light sources, said illumination cycle-portion overlaps said gathering step wherein a greater distance of said light sources of said one of said at least two groups of light sources from said privileged illumination zone corresponds to a longer overlap.

20. Method according to claim 17, wherein in said conversion cycle said acquisition step and said non-acquisition step are regulated by a shutter, which, when activated, determines said non-acquisition step, and when not activated, determines said acquisition step.

21. Method according to claim 17, wherein said sensor operates according to a succession of scanning steps having said same period, such scanning steps being alternately used and not used, so that said scanning steps used determine said acquisition steps, whereas said scanning steps not used determine said non-acquisition steps.

22. Method according to claim 21, wherein said illumination cycle-portion of said illumination cycle of one of said two groups of light sources temporally corresponds to said non-illumination portion of the other one of said two groups of light sources.

23. Method according to claim 15, wherein said reciprocally different timing is variable.

24. Method for reading a graphic pattern, comprising the steps of:

illuminating said graphic pattern with at least two groups of light sources, each of said at least two groups of light sources having at least one light source operating according to an illumination cycle that comprises an illumination cycle-portion and a non-illumination cycle-portion;

wherein said light sources of one of said at least two groups of light sources are activated according to equal illumination cycles, wherein said illumination cycles of said light sources belonging to different ones of said at least two groups of light sources have a reciprocally different timing;

gathering light from said light sources having been diffused by said graphic pattern on a sensor having a plurality of sensitive points, and converting, through a conversion cycle of said sensor, said light impinging on said plurality of sensitive points, point by point, into electric signals representative of single points of said graphic pattern, at a same time for all of said plurality of sensitive points;

wherein said reciprocally different timing is variable.

* * * * *